UNITED STATES PATENT OFFICE.

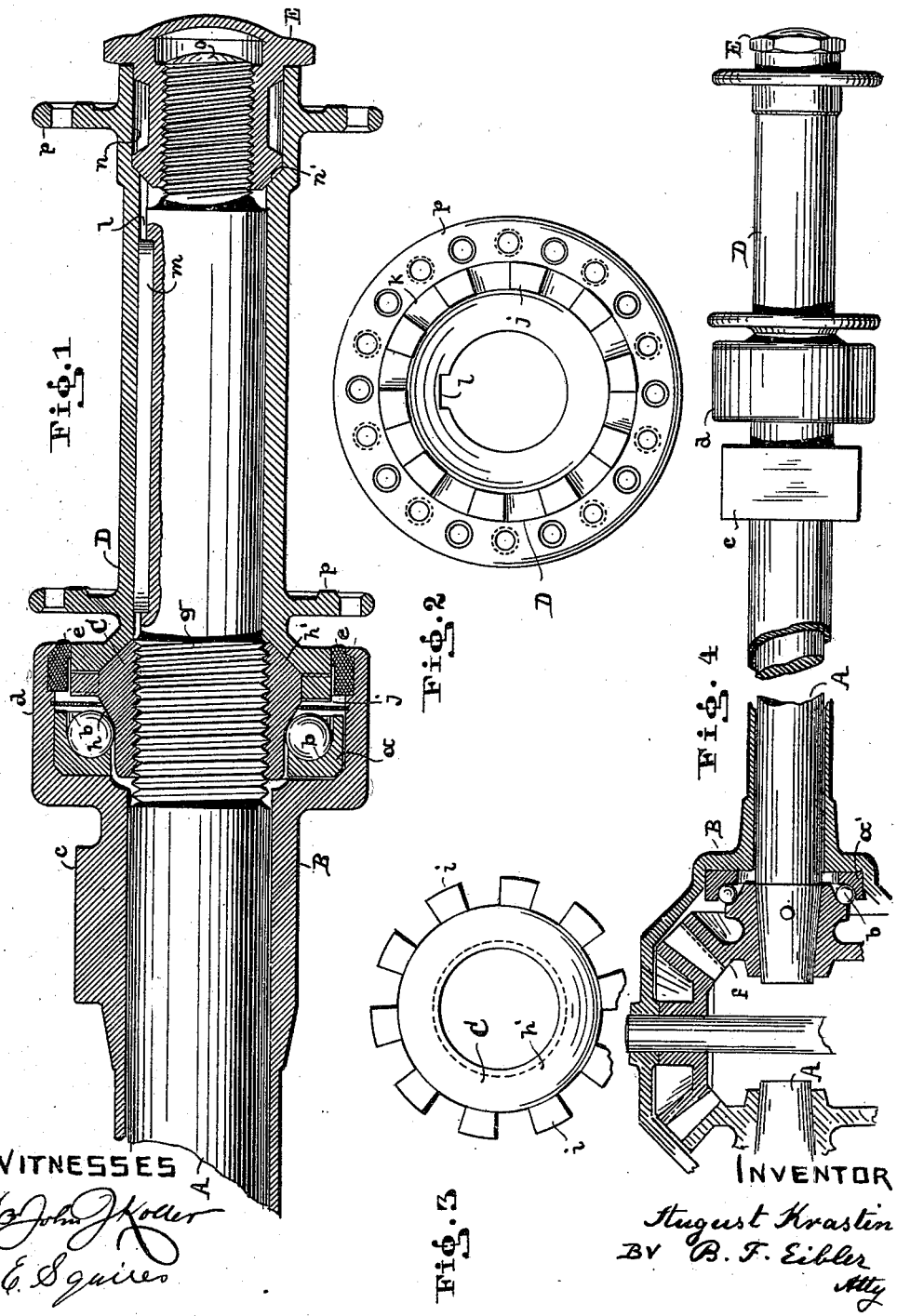

AUGUST KRASTIN, OF CLEVELAND, OHIO.

MOTOR-VEHICLE HUB AND AXLE.

SPECIFICATION forming part of Letters Patent No. 669,585, dated March 12, 1901.

Application filed July 5, 1900. Serial No. 22,496. (No model.)

*To all whom it may concern:*

Be it known that I, AUGUST KRASTIN, a citizen of the United States, residing at No. 50 Portland street, Cleveland, in the county of Cuyahoga and State of Ohio, have invented certain new and useful Improvements in Motor-Vehicle Hubs and Axles, of which the following is a specification.

My invention relates to improvements in motor-vehicle wheel-hubs and the axles therefor; and the object of my improvement is to render the connection of the wheel-hub with the axle absolutely safe and true and convenient for adjustment. I attain these objects in the manner and by the means as illustrated in the accompanying drawings, in which—

Figure 1 represents a longitudinal sectional view of a motor-vehicle rear axle and hub combined. Fig. 2 represents an inner face view of the hub. Fig. 3 is a face view of an adjusting-nut therefor. Fig. 4 is an exterior and part-sectional view of a two-part axle shown in reduced scale.

Like letters of reference denote like parts in the drawings and specification.

The characteristic feature of my invention consists in the equipment of the axles, their casing, and the wheel-hubs of the hind running-gear of and for a motor-vehicle. The axle A is used in duplicates, which are connected by means of a compensating gear and running within a suitable casing B. (See Figs. 1 and 4.)

The casing B is equipped with rings $a$ $a'$ for the reception of balls $b$ $b$, upon which the axles rotate. The casing also is used in duplicates, which are joined over the compensating gearing, as seen in Fig. 4. At $c$ a bracket is formed for the reception of the springs. The outer part of the casing terminates in a cup $d$, within which is fitted the ring $a$, above mentioned, also the packing-ring $e$. (See Fig. 1.) To the inner terminal of the axles is secured a bevel-wheel $f$, forming part of the compensating gearing. At $g$ a thread is formed for the reception of the collar C, of which the cone part $h$ forms a race for the balls $b$. Furthermore, said collar enables accurate adjustment of the axle with respect to the casing, and all lost motion of the axle can thereby be eliminated, and the balls themselves are confined between parts which form adjustable raceways. At $h'$ another cone is formed, against which the hub D of the wheel is brought to bear. Around the circumference of said collar and between the cone-faces are formed a series of lugs $i$, between which engage a series of lugs $j$, which project from the inner cone or ring part K of the hub. (See Figs. 1 and 2.) The hub itself is grooved in its bore, as at $l$, which groove engages over a feather $m$ upon the axle. The outer part of the hub is countersunk, as at $n$, with a beveled shoulder, as at $n'$. Within said counterpart is fitted the nut E, which screws over the outer terminal O of the axle. Onto the flanges $p$ $p$ the spokes are fastened in the usual manner. Owing to the cone-faces $h'$ and $n'$, a concentric gripping action can be effected upon the hub, which results in a true running of the wheel. The engagement of the hub with the collar forms a secure lock for the latter. Thus when once adjusted none of the parts can or will become loose. Furthermore, by means of the packing $e$ dust and dirt are prevented from entering the ball-chamber. Therefore the balls are exposed and subjected only to natural wear and tear, and even this is reduced to a minimum owing to the accurate adjustment in this improved hub-and-axle construction.

What I claim, and desire to secure by Letters Patent, is—

1. In combination, an axle, a wheel-hub, a casing for said axle, a race-ring in the cup terminal of said casing, balls, a double cone-faced notched collar, and a cone-faced nut, the latter two elements having screw connection upon and with said axle for adjustment of same and reception of the wheel-hub, which has a feather connection with the axle, there being counterpart cone-faces for said collar and nut and an interlocking engagement with said collar all constructed and arranged substantially as and for the purpose set forth.

2. The combination of an axle, an adjustable double-faced cone-collar having lugs which project between said cone-faces, a feather and a cone-faced nut, a wheel-hub fitting over said feathered axle, engaging said collar and held secure by said nut, a casing for the axle terminating in a cup, a ring in said cup and balls for said axle all constructed and arranged substantially as and for the purpose set forth.

3. The combination of a revoluble axle equipped with a notched collar a feather and a nut, and a wheel-hub adapted to fit said axle and equipped with lugs which interlock with said notched collar and are secured by said nut all constructed and arranged substantially as and for the purpose set forth.

In testimony whereof I hereunto affix my signature in presence of two witnesses.

AUGUST KRASTIN.

Witnesses:
   BERNH. F. EIBLER,
   GEO. SCHNUERN.